United States Patent
Muske

(10) Patent No.: US 10,002,064 B2
(45) Date of Patent: Jun. 19, 2018

(54) STATIC ANALYSIS BASED EFFICIENT ELIMINATION OF FALSE POSITIVE

(71) Applicant: Tata Consultancy Services Limited, Mumbai (IN)

(72) Inventor: Tukaram B Muske, Pune (IN)

(73) Assignee: Tata Consultancy Services Limited, Mumbai (IN)

(*) Notice: Subject to any disclaimer, the term of this patent is extended or adjusted under 35 U.S.C. 154(b) by 0 days. days.

(21) Appl. No.: 15/249,179

(22) Filed: Aug. 26, 2016

(65) Prior Publication Data

US 2017/0075787 A1    Mar. 16, 2017

(30) Foreign Application Priority Data

Sep. 15, 2015  (IN) .......................... 3537/MUM/2015

(51) Int. Cl.
*G06F 9/44* (2018.01)
*G06F 11/36* (2006.01)

(52) U.S. Cl.
CPC ............ *G06F 11/3608* (2013.01); *G06F 8/00* (2013.01)

(58) Field of Classification Search
CPC .................................................. G06F 11/3608
USPC .................................................. 717/123–129
See application file for complete search history.

(56) References Cited

U.S. PATENT DOCUMENTS

| 7,516,446 B2* | 4/2009 | Choi ......................... G06F 9/52 717/119 |
| 7,519,952 B2* | 4/2009 | Bordawekar ............. G06F 8/10 707/999.004 |
| 7,823,135 B2* | 10/2010 | Horning .................. G06F 21/14 713/187 |
| 8,006,233 B2* | 8/2011 | Centonze .................. G06F 8/75 717/125 |

(Continued)

FOREIGN PATENT DOCUMENTS

WO    WO-2014/180107    11/2014

OTHER PUBLICATIONS

Cole et al, "Improving Your Software Using Static Analysis to Find Bugs", ACM, pp. 673-674, 2006.*

(Continued)

*Primary Examiner* — Anil Khatri
(74) *Attorney, Agent, or Firm* — Finnegan, Henderson, Farabow, Garrett & Dunner LLP

(57) ABSTRACT

A method and a system is disclosed herein for model checker based efficient elimination of false positives from static analysis warnings generated during static analysis of an application code. The system computes complete-range non-deterministic value variables (cnv variables) that are based on data flow analysis or static approximation of execution paths by control flow paths. During computation of cnv variables, over approximation (may-cnv variables) and under approximation (must-cnv variables) of a set of cnv variables at a program point is identified. The computed cnv variables are used to check whether an assertion variable is (Continued)

a cnv variable and the corresponding assertion verification call is redundant or otherwise. The identified redundant calls are then skipped for the efficiency of the false positives elimination and the model checker is invoked corresponding to the non-redundant assertion verification calls.

10 Claims, 2 Drawing Sheets

(56) References Cited

U.S. PATENT DOCUMENTS

| | | | | |
|---|---|---|---|---|
| 8,209,301 | B2* | 6/2012 | Bordawekar | G06F 8/10 707/690 |
| 8,276,123 | B1* | 9/2012 | Deng | G06F 11/3688 714/37 |
| 8,336,034 | B2* | 12/2012 | Sinha | G06F 11/3608 714/38.1 |
| 8,359,578 | B2* | 1/2013 | Wang | G06F 11/3612 717/126 |
| 8,402,439 | B2* | 3/2013 | Gulwani | G06F 8/49 717/126 |
| 8,448,145 | B2* | 5/2013 | Ganai | G06F 11/3608 717/126 |
| 8,464,223 | B2* | 6/2013 | Choi | G06F 9/52 717/126 |
| 8,595,701 | B2* | 11/2013 | Li | G06F 9/4421 717/118 |
| 8,732,669 | B2* | 5/2014 | Valdiviezo Basauri | G06F 8/41 717/104 |
| 8,739,128 | B1* | 5/2014 | Cohen | G06F 11/3672 717/124 |
| 8,745,578 | B2 | 6/2014 | Pistoia et al. | |
| 8,776,027 | B2* | 7/2014 | Ergan | G06F 11/0748 717/120 |
| 8,799,874 | B2 | 8/2014 | Pistoia et al. | |
| 9,208,057 | B2* | 12/2015 | Valdiviezo Basauri | G06F 11/3608 |
| 9,619,375 | B2* | 4/2017 | Avgerinos | G06F 11/3688 |
| 9,652,360 | B2* | 5/2017 | Prasad | G06F 11/3608 |

OTHER PUBLICATIONS

Farzan et al, "Inductive Data Flow Graphs", ACM, pp. 129-142, 2013.*
Hovemeyer et al,Evaluating and Tuning a Static Analysis to Find Null Pointer Bugs, ACM, pp. 13-19, 2005.*
Popeea et al, "Dual Analysis for Proving Safety and Finding Bugs", ACM, pp. 2137-2143, 2010.*
Bae, "Concolic Testing with Static Analysis for JavaScript Applications", ACM, pp. 7-8, 2014.*
Widermann et al, "Extracting Queries by Static Analysis of Transparent Persistence", ACM, pp. 199-210, 2007.*
Schafer et al, "Dynamic Determinacy Analysis", ACM, pp. 165-174, 2013.*
Bergan et al, "Symbolic Execution of Multithreaded Programs from Arbitrary Program Contexts ", ACM, pp. 491-506, 2014.*

\* cited by examiner

STATIC ANALYSIS BASED EFFICIENT ELIMINATION OF FALSE POSITIVE

PRIORITY CLAIM

This U.S. patent application claims priority under 35 U.S.C. § 119 to India Application No. 3537/MUM/2015, filed on Sep. 15, 2015. The entire contents of the aforementioned application are incorporated herein by reference.

TECHNICAL FIELD

The present subject matter described herein, in general, relates to efficient elimination of false positives from analysis warnings generated from static analysis of an application code, and more particularly systems and methods to facilitate static analysis-based efficient elimination of false positives from static analysis warnings.

BACKGROUND

A static analysis technique for defects detection in an application code has been widely used in practice for ensuring software quality and reliability. Initially, the application code may be analyzed using the static analysis, performed by static analysis tools, to generate one or more static analysis warnings. These warnings are generated and reported to user by the analysis tools when the tools are unable to decide about the safety at the program points corresponding to the warnings. In practice, many times, a large portion of the warnings are falsely generated due to the approximations used by the static analysis tools, and they are referred to as false positives. Manual review of the static analysis warnings may be inevitable to fulfill the practical needs of constructing trusted software by identifying manually the false positives and true errors from the static analysis warnings reported by a static analysis tool. Since the review is performed manually, there is a high cost associated with the manual reviewing process. The cost of manual review may be reduced by increasing precision of the static analysis results, or identifying and eliminating automatically the false positives from the static analysis warnings.

Model checking is more precise in property verification as compared to static analysis. However, the model checking of a larger code fragments often faces scalability and poor performance issues as the size and complexity of software systems increases. These issues are faced by model checker due to the state space explosion.

The model checking and the static analysis are well-known techniques for finding warnings in application code. These two techniques have proven to be valuable in practice for ensuring software quality and reliability but they are complementary on the metrics of scalability, precision and efficiency.

The techniques, static analysis and model checking, being complementary can be combined together to achieve better results than the results obtained by them in isolation. The model checker may be used in cascade with static analysis to eliminate the false positives generated by the static analysis.

An incremental approach is used to address the issue of non-scalability of the model checkers on a very large code application. This approach starts with the minimal code context and later increases the context if needed and it has been found to be useful in practice. In this approach, the model checking of the assertion starts with a small calling context in which variables receiving values from outside the context are modelled to take any arbitrary value. The variables taking such values from outside the context are called as input variables. The input variables may be initialized by generating arbitrary values through non-deterministic choice functions. A calling context may be expanded on a need basis to include callers higher up in the call chains. While this calling context aids scalability by keeping the calling context as small as possible, it may require multiple calls to the model checker for the same assertion which increases the time required to process an assertion using model checking. Incremental expansion of the calling contexts may be required when the model checking in a smaller context finds a counterexample. The counterexample generated may not be because of the values assigned to variables by the statements in the program code but it might be because of the non-deterministic choice functions introduced outside of the context to generate arbitrary values to the corresponding input variables. That is, when the variables involved in an assertion are allowed to take any arbitrary value at the point of assertion, that are generated by the non-deterministic choice functions, the assertion may be violated by some or the other combination of values. In such cases, using the model checker may not aid in resolution of the corresponding warning and hence the assertion verification is redundant.

Accordingly, the present system and method describes static analysis-based efficient elimination of one or more false positives from static analysis warnings generated during the property verification.

SUMMARY

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below.

In view of the foregoing, an embodiment herein provides a system and a method to identify redundant verification calls to model checker for efficient elimination of false positives and thus improving performance during a model checking-based elimination of false positives.

In one aspect, a method for efficient elimination of false positives is provided. The method performs a static analysis on an application code to generate static analysis warnings using a static analyzer module. The method further generates an assertion corresponding to each warning generated by static analyzer module using annotator module. The method further computes one or more set of cnv variables through the data flow analysis using a cnv variables identifier module. The method further checks using a cnv variables checker module whether the one or more assertion variables are cnv variables at the assertion program points. Further, it determines whether the verification calls for each assertion generated corresponding to each warning is redundant or not using a redundant calls identifier module. In addition to this, in the next step where the method skips the redundant verification calls to cause efficient elimination of false positives. And finally in the last step, identifying redundant verification calls to cause efficient elimination of false positives and invoking the model checker to verify a non-redundant assertion verification call and to eliminate the corresponding static analysis warning as false positive depending on the outcome of the verification using an assertion verifier module.

In another aspect, a system for efficient elimination of false positives in static analysis of application code is provided. The system includes a processor, a memory communicatively coupled with the processor, wherein the memory contains instructions that are readable by the processor, a static analyzer module to analyze the application code in order to generate a plurality of static analysis warnings, an annotator module to generate an assertion corresponding to each static analysis warning of the plurality of static analysis warnings, a complete-range non-deterministic value (cnv) variables identifier module to compute one or more set of cnv variables corresponding to each assertions of the application code using a data flow analysis, a cnv variables checker module to check whether the variables corresponding to assertions are cnv variables or not corresponding to plurality of static warnings within the application code, a redundant calls identifier module to identify whether one or more assertion verification calls of model checker is redundant or otherwise, a model checker to verify whether an assertion from the plurality of assertions corresponding to each warning is an error or false positive, and an assertion verifier module to invoke the model checker to verify a non-redundant assertion call to check if whether a warning corresponding to the plurality of assertions is an error or false positive and to eliminate the corresponding static analysis warning as false positive depending on the outcome of the verification by the model checker.

In another aspect, the disclosure also provides for computation of complete-range non-deterministic value variables (hereinafter referred as cnv variables) through data flow analysis. The data flow analysis is based on static approximations of execution paths by control flow paths. It would be appreciated that the cnv variables also can be computed in various ways and using different analyses.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

BRIEF DESCRIPTION OF THE DRAWINGS

The embodiments herein will be better understood from the following detailed description with reference to the drawings, in which.

DETAILED DESCRIPTION OF EMBODIMENTS

Figure 1:
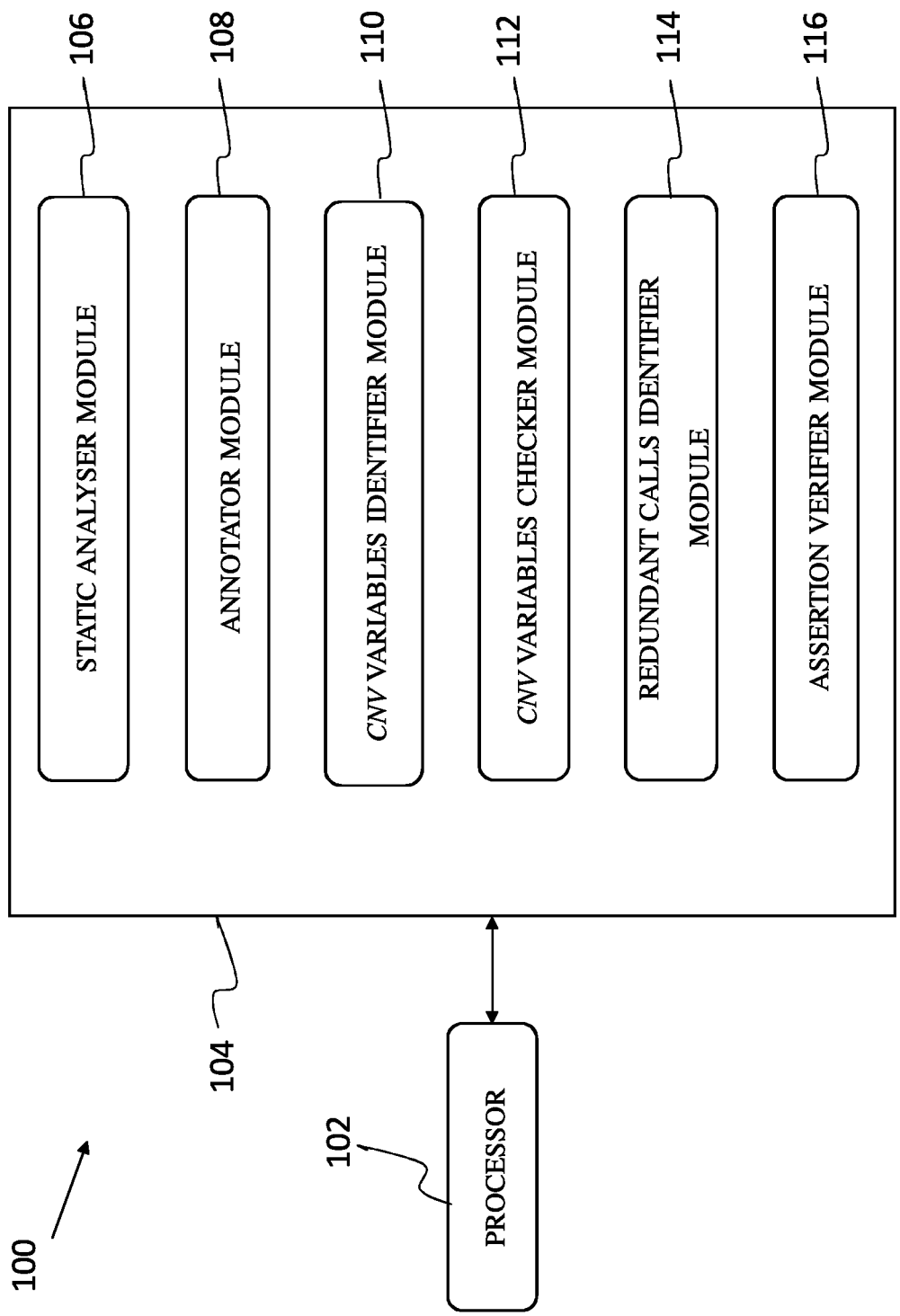
FIG. 1 is a block diagram showing a system for efficient elimination of false positives from static analysis warnings generated during static analysis of application code according to an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The present disclosure relates to a system and a method to identify redundant verification calls for efficient elimination of false positives and thus improving performance during a model checking-based elimination of false positives. In one aspect, the disclosure also provides for computation of cnv variables through the static approximation of execution paths by control flow paths (data flow analysis).

GLOSSARY—TERMS USED IN THE EMBODIMENTS WITH EXPLANATION

The disclosure described herein, defines few terms and concepts to understand the disclosure to a person skilled in the art are— a) Assertion Variables: Assertion is a boolean expression describing a constraint on the values of the variables occurring in the expression. The variables occurring in an assertion are called as assertion variables.

b) Input Variables: Computations in a procedure could depend on global variables and formal parameters which take values from the calling contexts. Such variables are termed as input variables of the procedure. Input variables are procedure specific and they are mutable variables. These variables are read before they are written to on any of the paths in the procedure including the paths in the functions called by the procedure transitively.

c) Non-deterministic Choice Functions: During model checking-based elimination of false positives, an assertion is verified in the context of a procedure where the assertion appears in a statement either in the procedure or one of its transitively called function. For scalability of the assertion verification, the procedure may be chosen as close to the assertion in the call hierarchy as possible and the callers of the procedure are ignored. However, this comes at the cost of imprecision, since the code assigning values to input variables of the procedure is ignored, the assertion should be verified for arbitrary values of the inputs. The arbitrary values are assigned to the input variables by using Non-deterministic Choice Functions. The range of the non-deterministic values generated by these functions is determined by their return types.

d) Complete-range Non-deterministic Value Variables: Values assigned to input variables of a procedure by the non-deterministic choice functions may get assigned to other variables in the procedure as a consequence of data-dependence. These values also may get constrained through control or data-dependence. The variables taking the complete or full range of the non-deterministic values may be categorized as Complete-range Non-deterministic Value variables (cnv variables), and the other set of variables, which are fixed values assigned by the program statements, as are non-cnv variables (those taking only partial range or no range of non-deterministic values).

e) Complete-Range Non-deterministic Value Expressions: An expression occurring in statement may said to be a cnv expression in the calling context of a procedure if its evaluation using the cnv variables at the same point and in the same context results in the complete range of values of the expression.

The disclosure discloses herein, to minimizing the number of model checker calls for an assertion by identifying and eliminating the redundant calls. The non-redundant calls in which the variable may not allowed to take all possible values at the point of assertion are verified by model checker. In the present disclosure, the factors that may influence computation of cnv variables are as follows:

a) Context Sensitivity: The assignments involving non-deterministic choice functions may be introduced to assign arbitrary values to the input variables at the start of the procedure that begins the calling context under consideration during/for verification of an assertion. Based on these functions for a procedure, a variable is identified whether it is a cnv variable or not at a program point in the procedure. Different procedures may have different input variables for them. Therefore, a variable at a program point may be a cnv variable for a specific calling context (procedure) but not for some other calling context (procedure).

b) Flow Sensitivity: The range of non-deterministic values taken by a variable is program point-specific and it may be different at different program points. Flow sensitivity influences the cnv status of a variable (whether the variable is a cnv variable or non-cnv variable) by the following two dependencies:

i) Data Dependence: A cnv variable at a program point may influence the values of a non-cnv variable and may convert its status or vice-versa.

ii) Control Dependence: The conditions involving a cnv variable may restrict the values of the variable along their true or false branches, thus making the cnv variable as a non-cnv variable inside the effect of the conditions However, outside the effect of the conditions, the non-cnv variable regains its status and becomes a cnv variable if it is a cnv variable just before the conditions.

c) May/Must Reachability: The cnv status of a variable at a program point depends on the paths along which variable is cnv. When the variable is cnv variable along every path reaching the program point, the variable is said to be a must-cnv variable at that point. If the variable is cnv variable along some path but not necessarily through all paths reaching the program point it is referred to as a may-cnv variable.

The model checking technique is precise in property verification but lack of scalability, detriments its extensive use in large and complex application code. Static analysis is able to find programming errors in large and complex application code. However, due to the lack in precision of the static analysis, the technique generates a large number of warnings in practice of which many are false positives. To address these issues faced by static analysis and model checking, they are combined one after the other (cascaded). In the cascading approach, an assertion is generated corresponding to each warning reported by static analysis, and the assertion is verified using a model checker to classify the warning either as a possible error or false positive. If the assertion is verified successfully by the model checker, the warning corresponding to the assertion verified is a false positive and it is eliminated (removed from the final reporting to the user). When the verification of the assertion by the model checker generates a counter example, the warning remains and it is not eliminated. However, this approach has an issue of poor performance.

The disclosure proposed herein is a system and a method for effective elimination of false positives while dealing with the non-scalability of the model checking.

A system (100) for model checking-based efficient elimination of false positives in static analysis of application code is shown in FIG. 1, according to an illustrative embodiment of the disclosure. The system (100) includes a processor (102) and a memory (104) in communication with the processor (102). The memory (102) further comprising a plurality of modules such as a static analyzer module (106), an annotator module (108), a cnv variables identifier module (110), a cnv variable checker module (112), a redundant calls identifier module (114) and an assertion verifier module (116).

In the preferred embodiment, the static analyzer module (106) is configured to analyze the application code in order to generate a plurality of static analysis warnings. Many of these static analysis warnings are falsely reported, commonly referred to as false positives. These false positives are due to imprecision of the static analysis.

In the preferred embodiment, the annotator module (108) generates assertions, wherein each generated assertion corresponds to each static analysis warning from plurality of static analysis warnings.

In the preferred embodiment, the cnv variables identifier module (110) is configured to compute a one or more set of cnv variables using a data flow analysis. It would be appreciated that the computation of cnv variables is through the static analysis technique and the static analysis technique could be a data flow analysis, abstract interpretation, control flow etc. In this disclosure, the computation of cnv variables has been explained only with data flow analysis. The influence of the set of cnv variables on identifying verification calls as redundant may be different depending on the variations in the computation of cnv variables. The variations arise in the computation of cnv variables because of the approximations used in the computations.

Further, the cnv variables identifier module (110) may identify cnv variables through data flow analysis. The data flow analysis is based on static approximation of execution paths by control flow paths. There are two kinds of approximations (a) over-approximation of execution paths by control flow paths, and (b) over-approximation or under-approximation of the set of cnv variables at a program point. The cnv variables identifier module (110) computes the cnv variables of two different types: a) may-cnv variables, and b) must-cnv variables. A may-cnv variables analysis may over-approximate the set of cnv variables whereas a must-cnv variables analysis may under-approximate it. The over-approximation of truly cnv variables is computed using data flow analysis, wherein the over-approximation may include computing and reporting of some non-cnv variables as cnv variables. With the over-approximation approach, the analysis may identify more redundant verifications calls although with lower accuracy. With the under approximation approach, the analysis may identify fewer redundant verification calls but with increased accuracy because every variable included in the set is more likely to be a cnv variable although it may have missed some genuine cnv variables. Thus, the cnv status of a variable at a program point depends on the paths along which the variable is cnv variable. When the variable is cnv variable along every path reaching the program point, the variable is said to be a must-cnv variable at that point. And if the variable is cnv along some path but not necessarily on all paths reaching the program point, the variable is a may-cnv variable.

In the preferred embodiment, the cnv variables checker module (112) checks whether one or more variables in the assertions are cnv variables or not.

In the preferred embodiment, the redundant calls identifier module (114) identifies whether the one or more assertion verification calls to a model checker are redundant or non-redundant based on the result obtained by the cnv variables checker module (112). It would be appreciated that the cnv variables may not identify all redundant verification calls correctly, still it provides an efficient approach to verify assertion verification calls.

In the preferred embodiment, the assertion verifier module (116) is configured to invoke a model checker to verify the assertion from the plurality of assertions when the redundant calls identifier module (114) identifies some assertion verification call as non-redundant. Based on the verification result, the warning corresponding to the assertion verified is determined as an error or a false positive. The model checker may take an entry function, and a property to be verified that may be expressed as an assertion. The entry function specified represents a verification code context at which the assertion is to be verified. If the assertion holds for all execution paths, the model checker reports verification success (i.e. the assertion holds in the given code context). In such cases, when verification success is reported for verification of an assertion corresponding to a static analysis warning, the warning is a false positive and is eliminated. If the assertion does not hold for any of the execution paths, the model checker generates an error trace leading to the property violation or simply reports the violation of the property, and the corresponding warning remains, that is, it is not eliminated.

Referring to an example according to an embodiment of the disclosure, as shown in the Table 1 below, wherein the verification of the application code using the static analysis reports a divide by zero warning at line 39. This warning is a false positive as it is falsely reported by a static analyzer. The only way the variable denom can be zero is if the variable p is zero as in line 34. This requires the actual argument var of the call to function f3 to be zero, as in line 23, which depends on the values of the variable factor (line 22). Given the initialization of array arr for any combination of index variables satisfying i<j, the RHS of the assignment at line 12 can never be zero, ruling out any possibility of factor, and hence denom, being zero.

TABLE 1

| | |
|---|---|
| 1. | const int arr[] = {0, 2, 5, 9, 14}; |
| 2. | int ch, var, factor; |
| 3. | |
| 4. | void f1(){ |
| 5. | unsigned int i, j; |
| 6. | |
| 7. | i = lib1(); |
| 8. | j = lib2(); |
| 9. | var = lib3(); |
| 10. | |
| 11. | if(i < j && j < 5){ |
| 12. | factor = arr[j] − arr[i]; |
| 13. | f2(); |
| 14. | } |
| 15. | } |
| 21. | int f2(){ |
| 22. | if(var == factor) |
| 23. | f3(var); |
| 24. | ... |
| 25. | } |
| 31. | int f3(int p){ |
| 32. | int a, b, denom = 1; |

TABLE 1-continued

| | |
|---|---|
| 33. | if(ch < 5) |
| 34. | denom = p; |
| 35. | else |
| 36. | denom = 10; |
| 37. | |
| 38. | assert(denom!=0); |
| 39. | a = 100 / denom;//warning |
| 40. | |
| 41. | if(b < 10) |
| 42. | ch = p; |
| 43. | } |

In order to handle the example warning, an assertion may be added at the warning point. Corresponding to the divide by zero warning at line 39, an assertion is added at line 38. For the succinct description of the examples, $A_n$ is used to denote an assertion at line n, and its verification in the calling context beginning with procedure f is denoted as $V(A_n, f)$. In the given Table 1 wherein the first call to model checker is $V(A_{38}, f3)$ with non-deterministic values assigned to the variables receiving values from outside the context of f3 (p and ch). These values are assigned at the start of f3 and are shown below.

| // procedure f1 | // procedure f2 | // procedure f3 |
|---|---|---|
| ch = nondet_char(); | var = nondet_int(); | p = nondet_int(); |
| | ch = nondet_char(); | ch = nondet_char(); |
| | factor = nondet_int(); | |

The model checker trivially finds a counterexample for the verification call $V(A_{38}, f3)$ by choosing the value of p as 0. Since a counter example is generated, the warning cannot be marked as false positive, and thus, the verification code context needs to be expanded to callers (function f2) of the function f3. In the second verification call $V(A_{38}, f2)$ expands the calling context with non-deterministic values assigned to the variables receiving values from outside the context of f2 (var, ch, and factor shown in the above figure). The model checker once again reports a counterexample by choosing var and factor to be 0. Similarly, on the counterexample generation, the context is expanded to function f1. In the third call $V(A_{38}, f1)$ assigns non-deterministic values to the variables receiving values from outside the context of f1 (ch). Now regardless of the values of i and j, the model checker fails to find value 0 for factor, and hence it declares that the assertion $A_{39}$ always holds. Thus the verification call $V(A_{38}, f1)$ eliminates the warning at line 39 it being as a false positive.

From Table 1, wherein model checker is invoked multiple times for the same assertion, the first and second calls do not contribute in eliminating the false positive. These calls generate the counterexamples because the values assigned by the non-deterministic choice functions reach to the assertion point unconstrained. Hence these calls may provably be redundant.

The cnv status of a variable v at a program point may depend on the paths along which v is cnv. When the variable v is cnv along every path reaching the program point, the variable v is said to be a must-cnv variable at that point. If it is cnv along some but not necessarily all paths reaching the program point, it is a may-cnv variable.

Referring to a data flow analysis for identification of cnv variables in an intra-procedural settings which may be easily lifted to inter-procedural setting. In the data flow analysis, let N be the set of nodes in the control flow graph of the program being analyzed, and V be the set of program variables. Defining S={CNV, nCNV, nCNV$_T$, nCNV$_F$}, as shades of the cnv status of a variable v∈V at a node n∈N, where— i) CNV: v is a cnv variable.
ii) nCNV: v is not a cnv variable due to data dependence on a non-cnv variable or expression.
iii) nCNV$_T$: v is not a cnv variable due to control dependence (when its values are constrained along the paths reachable from true branch of a condition).
iv) nCNV$_F$: v is not a cnv variable due to control dependence (when its values are constrained along the paths reachable from false branch of a condition).

The lattices to compute the may-cnv and must-cnv variables using data flow analysis, are shown below. It would be appreciated that the foregoing relates only to the exemplary embodiments of the present disclosure, and that numerous changes may be made thereto without departing from the spirit and scope of the disclosure.

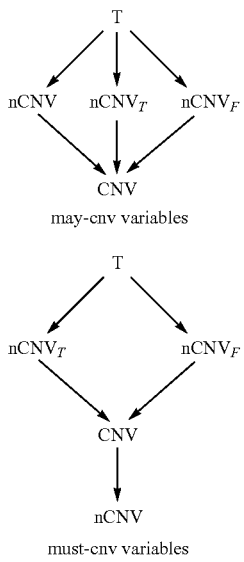

(a) may-cnv variables (b) must-cnv variables

In the data flow analysis the lattice computes subsets of stat=V→S flow sensitively at each node n ∈ N, and the lattice of these values is (A=2$^{stat}$, πA). As stat=V→S may be defined in terms of the lattice (S, πs), the meet operation π$_A$ is defined in terms as $$x, y \in A : x\pi_A y = \{(v,(s\pi s\ s'))|(v,s) \in X, (v,s') \in y\} \quad (1)$$

In the data flow analysis wherein element T in the lattice is a fictitious value used as an initialization. The meet of nCNVT and nCNVF results in CNV. The element ⊥ in the above fig. (a) is CNV indicating that v is a cnv variable along some path. The element ⊥ in the above fig (b) is nCNV indicating that v is not a cnv variable if it is not a cnv along any of the paths. In the data flow analysis, the data flow equations 2 to 7 as shown below, wherein the equation 7 shows the status of a variable v is changed to nCNVT as an effect of condition v⊕expr, if and only if (a) v has its status as CNV before to the condition, (b) expr is not a cnv expression, and (c) the edge is labeled as true. ⊕ is used to show a relational operator in a condition. The status of a variable v is changed to nCNVF as an effect of condition v⊕expr, if and only if (a) v has its status as CNV before to the condition, (b) expr is not a cnv expression, and (c) the edge is labeled as false.

Let $m, n \in N$ and $u, v \in V$ $$In_n = \begin{cases} [(v, CNV) | v \in V] & n = StartNode \\ \bigcap_A\limits_{m \in prod(n)} Edge_{m \to n}(Out_m) & \text{otherwise} \end{cases} \quad (2)$$

$$Out_n = \text{update}(In_n, n) \quad (3)$$

$$\text{update}(X, n) = \begin{cases} X[v \to nCNV] & n:v = \text{constant} \\ X[v \to X(u)] & n:v = u \\ \text{Assign}(X, v, \text{expr}) & n:v = \text{expr} \end{cases} \quad (4)$$

$$\text{Assign}(X, v, \text{expr}) = \begin{cases} X[v \to nCNV] & isCNV(\text{expr}, X) = \text{false} \\ X[v \to CNV] & isCNV(\text{expr}, X) = \text{true} \end{cases} \quad (5)$$

$$Edge_{m \to n}(X) = \quad (6)$$
$$\begin{cases} X & \text{edge } m \to n \text{ is unconditional} \\ Cond(X, v, \text{label}(m \to n), \text{expr}) & \text{edge } m \to n \text{ is conditional,} \\ & \text{where } m:v \oplus \text{expr} \end{cases}$$

$$Cond(X, v, lbl, e) = \quad (7)$$
$$\begin{cases} X[v \to nCNV_T] & X(v) = CNV \text{ and } lbl = \text{true and} \\ & isCNV(e, X) = \text{false} \\ X[v \to nCNV_F] & X(v) = CNV \text{ and } lbl = \text{false and} \\ & isCNV(e, X) = \text{false} \\ X & \text{otherwise} \end{cases}$$

According to another example according to an embodiment of the disclosure, as shown in the Table 2, wherein one or more redundant verification calls (RVCs) may be identified through cnv variables. The influence of may-cnv and must-cnv variables on identification of the RVCs may be different because of the nature of approximation used in the two computations. The may-cnv analysis over-approximates the set of cnv variables whereas the must-cnv analysis under-approximates it. With over-approximation, the may-cnv variables may identify more RVCs although with lesser accuracy. With under-approximation, the must-cnv variables may identify fewer RVCs but with increased accuracy because every variable included in the set is more likely to be a cnv variable although it may have missed some genuine cnv variables.

TABLE 2

1. void foo(){
2.     b = 0;
3.     if(v == ) {
4.         a = 10;
5.         b = 10;
6.     }
7. 
8.     if(v == 1)
9.         assert(a )= 0);
10. 
11.     if(b == 10)
12.         assert(v == 1);
13. }

Referring to Table 2, an example to analyze impact of set of cnv variables, wherein the impact of may-cnv and must-cnv variables on RVCs may be different because of approximations used in the two computations. The must-cnv variables analysis may discover variable v to be a cnv variable at line 12 and V (A$_{12}$, foo) as an RVC whereas v is guaranteed to have value 1 on line 12. Since the condition on line 11 does not involve v, therefore it assumes that v is unconstrained. Effectively, it may consider an execution path in which line 12 is executed but line 5 is not executed. Clearly, that no such execution path is possible because every path that passes through line 12 must necessarily pass through line 5 also. Since the set of cnv variables computed using the data flow analysis is an over-approximation of truly cnv variables, inclusion of non-cnv variables may be reported as cnv variables. Due to such false reporting the usage of computed cnv variables this way may end up eliminating one or more model checking calls that are actually required to eliminate a false positive.

Figure 2:
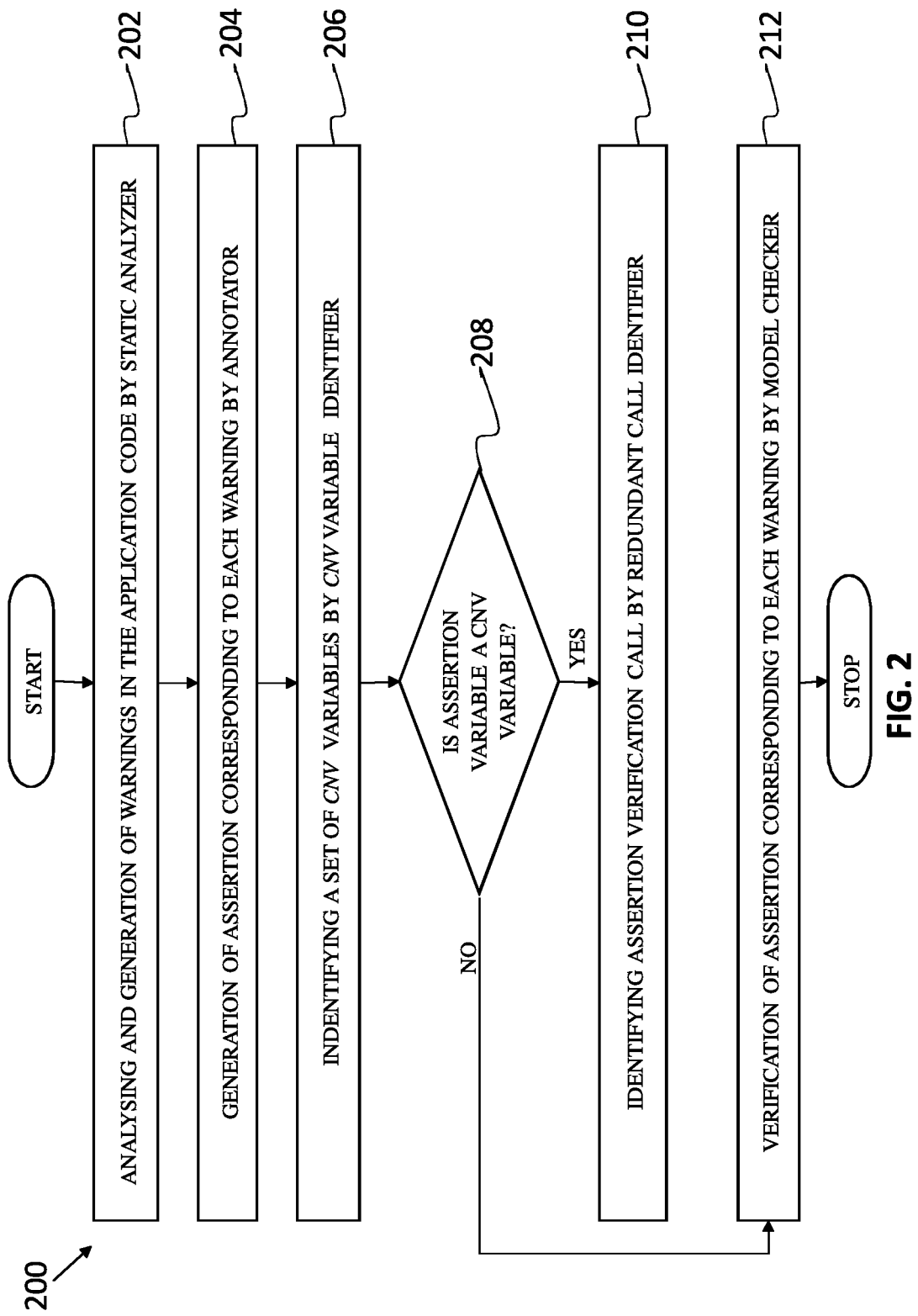
FIG. 2 illustrates a flow diagram showing a method for efficient elimination of false positives in static analysis of application code according to an embodiment of the present disclosure.

Referring now FIG. 2 which illustrates a method (200) for facilitating the model checker-based efficient elimination of one or more false positives generated during static analysis of an application code.

In the preferred embodiment at step 202, the application code is analyzed by the static analyzer module (106). Further, based on the analysis the warnings are generated by the static analyzer module (106).

In the preferred embodiment at step 204, the annotator module (108) is used to generate assertions corresponding to each warning generated by the static analyzer module (106).

In the preferred embodiment at step 206, the cnv variables identifier module (110) identifies the set of cnv variables at all program points of assertions generated by the annotator module (108).

In the preferred embodiment at step 208, the cnv variables checker module (112) checks whether an assertion variable is a cnv variable or not. And if it is a cnv variable then in the next step at 210, the redundant calls identifier module (114) is configured to identify a model checking call to verify the corresponding assertion as redundant.

In the preferred embodiment at step (212) when an assertion variable is not a cnv variable, the assertion verifier module (116) invokes the model checker to verify the assertion from the plurality of assertions. Based on the verification result the warning corresponding to the assertion verified, is determined as an error or a false positive.

If the conditions of step 208 are not matched by the cnv variables checker module (112), i.e. if the assertion variable is not a cnv variable then in the last step (212), the assertion verifier module (116) invoked model checker to verify the assertion from the plurality of assertions. Based on the verification result the warning corresponding to the assertion verified, is determined as an error or a false positive.

The embodiments of present disclosure herein addresses unresolved problem of invoking one or multiple times the model checker for the same assertion corresponding to static analysis warning of the application code when the verification call is more likely to generate a counterexample. The embodiments, thus provide systems and methods for facilitating the model checking/checker-based efficient elimination of the false positives generated during the static analysis of the application code. In view of the foregoing, it would be appreciated that the present disclosure may end up with efficient elimination of one or more false positive from plurality of false positives generated by static analysis. Still, it should be understood that the foregoing relates only to the exemplary embodiments of the present disclosure, and that numerous changes may be made thereto without departing from the spirit and scope of the disclosure.

Although implementations of system and method for integrating data from plurality of sources and to present a comprehensive view to the consuming applications, it is to be understood that the specific features and methods are disclosed as examples of implementations for integrating data from plurality of sources and to present a comprehensive view to the consuming applications.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for efficient elimination of false positives generated in static analysis of an application code, the method comprising:

performing static analysis on the application code to generate a plurality of static analysis warnings using a static analyzer module;

generating an assertion corresponding to each of the plurality of static analysis warnings using an annotator module;

computing one or more set of complete-range non-deterministic value (cnv) variables through static analysis using a cnv variables identifier module, wherein the one or more set of cnv variables include complete-range of non-deterministic values;

checking whether one or more variables in respect of the generated assertion are cnv variables or not at each of the assertion program points using a cnv variables checker module;

determining whether one or more verification calls for each generated assertion corresponding to the each of the plurality of static analysis warnings are redundant or non-redundant based on presence of the one or more set of cnv variables, using a redundant calls identifier module;

skipping the one or more determined redundant verification calls to cause efficient elimination of false positives;

invoking a model checker to verify the one or more non-redundant verification calls by using an assertion verifier module; and eliminating by the assertion verifier module the corresponding static analysis warning as false positive depending on the outcome of the verification using a model checker;

wherein the identification of redundant verification calls may use the criterion of single or all assertion variables to be cnv variables at the assertion program point.

2. The method claimed in claim 1, wherein the cnv status of a variable at a program point depends on the paths that assign or restrict values of the variables and reaching the program point.

3. The method claimed in claim 1, wherein the computing of the cnv status involves considering the effect of control- and data-dependence using at least one static analysis techniques and computing them using at least one approximations.

4. The method claimed in claim 3, wherein the static analysis techniques include data flow analysis, abstract-interpretation and control-flow graph traversal.

5. The method claimed in claim 1, wherein when the variable is cnv variable along every path reaching the program point, the variable is said to be a must-cnv variable at that point.

6. The method claimed in claim 1, wherein when the variable is cnv variable along some but not necessarily all paths reaching the program point, the variable is said to be a may-cnv variable at that point.

7. The method claimed in claim 1, wherein the influence of may-cnv and must-cnv variables on identification of the redundant verification calls is different because of the nature of approximation used in the computations.

8. A system for efficient elimination of false positives in static analysis of application code, the system comprises:
a processor,
a memory communicatively coupled with the processor, wherein the memory contains instructions that are readable by the processor;
a static analyzer module is configured to analyze the application code in order to generate a plurality of static analysis warnings;
an annotator module is configured to generate an assertion corresponding to each of the plurality of static analysis warnings;
a complete-range non-deterministic value (cnv) variables identifier module is configured to compute one or more set of cnv variables corresponding to each assertion of the application code using the static analysis techniques,
wherein the one or more set of cnv variables include complete-range of non-deterministic values;
a cnv variables checker module is configured to check whether the variables in respect of the generated assertion are cnv variables or not at each of the assertion program points;
a redundant call identifier module is configured to identify whether one or more verification calls for each generated assertion corresponding to the each of the plurality of static analysis warnings are redundant or non-redundant based on presence of the one or more set of cnv variables, further wherein the system skips the one or more determined redundant verification calls to cause eliminate elimination of false positives efficiently; and
an assertion verifier module is configured to invoke a model checker to verify the one or more non-redundant verification calls and to eliminate the corresponding static analysis warning as false positive depending on the outcome of the verification;
wherein the identification of redundant verification calls may use the criterion of single or all assertion variables to be cnv variables at the assertion program point.

9. The system claimed in claim 8, wherein the assertion verifier module verifies an assertion one or more times depending on whether the context expansion or incremental verification approach is used or not.

10. A computer readable medium storing instructions for efficient elimination of false positives in static analysis of application code, the method comprising:
performing static analysis on the application code to generate a plurality of static analysis warnings using a static analyzer module;
generating an assertion corresponding to each of the plurality of static analysis warnings using an annotator module;
computing one or more set of complete-range non-deterministic value (cnv) variables through static analysis using a cnv variables identifier module, wherein the one or more set of cnv variables include complete-range of non-deterministic values;
checking whether one or more variables in respect of the generated assertion are cnv variables or not at each of the assertion program points using a cnv variables checker module;
determining whether one or more verification calls for each generated assertion corresponding to the each of the plurality of static analysis warnings are redundant or non-redundant based on presence of the one or more set of cnv variables, using a redundant calls identifier module;
skipping the one or more determined redundant verification calls to cause efficient elimi-nation of false positives;
invoking a model checker to verify the one or more non-redundant verification calls by using an assertion verifier module; and
eliminating by the assertion verifier module the corresponding static analysis warning as false positive depending on the outcome of the verification using a model checker;
wherein the identification of redundant verification calls may use the criterion of single or all assertion variables to be cnv variables at the assertion program point.

* * * * *